(12) United States Patent
Rolston

(10) Patent No.: US 8,478,099 B2
(45) Date of Patent: Jul. 2, 2013

(54) OPTICAL BACKPLANE RACK ASSEMBLY WITH EXTERNAL OPTICAL CONNECTORS

(75) Inventor: David R. Rolston, Beaconsfield (CA)

(73) Assignee: Reflex Photonics Inc., Pointe-Claire, QC (CA)

(*) Notice: Subject to any disclaimer, the term of this patent is extended or adjusted under 35 U.S.C. 154(b) by 520 days.

(21) Appl. No.: 12/618,309

(22) Filed: Nov. 13, 2009

(65) Prior Publication Data
US 2011/0116755 A1 May 19, 2011

(51) Int. Cl.
*G02B 6/00* (2006.01)
(52) U.S. Cl.
USPC .......................................... 385/135; 385/136
(58) Field of Classification Search
USPC .................................. 385/135, 136
See application file for complete search history.

(56) References Cited

U.S. PATENT DOCUMENTS

| | | | |
|---|---|---|---|
| 4,911,510 A * | 3/1990 | Jenkins | 385/136 |
| 6,364,541 B1 * | 4/2002 | Nesnidal et al. | 385/92 |
| 7,161,930 B1 | 1/2007 | Wang et al. | |
| 7,466,924 B2 | 12/2008 | English | |
| 2002/0159742 A1 | 10/2002 | Rumer et al. | |
| 2003/0039014 A1 | 2/2003 | English | |
| 2008/0013880 A1 * | 1/2008 | Pitwon | 385/14 |

FOREIGN PATENT DOCUMENTS

| WO | WO 02/05002 A | 1/2002 |
|---|---|---|
| WO | WO 2009108092 A | 9/2009 |

OTHER PUBLICATIONS

Opitcal CrossLinks, Inc. Preliminary Product Brief dated Apr. 14, 2005.
High-density FlexPlane Optical Circuitry provides high-density optical routing on PCBs or backplanes, 2008.
EPO—Supplementary European Search Report—EP 10 82 9393—(EPO Form 1503 03.82)—Mar. 22, 2013—4 pages.

* cited by examiner

Primary Examiner — Ryan Lepisto
Assistant Examiner — Jerry M Blevins
(74) Attorney, Agent, or Firm — Benoît & Côté

(57) ABSTRACT

There is described a line card rack assembly for line cards, and an optical backplane and optical fiber guide for installation to a frame adapted to receive line cards of which at least one has an optical connector at a front portion thereof. The rack assembly comprises a frame having a front opening, for receiving the line cards and providing access to a front end of the line cards, and a back opening opposite the front opening; an optical backplane at least partially covering the back opening, the optical backplane comprising connections for connecting the line cards upon insertion in the frame; and optical fiber cable having two ends, a first one of the two ends being for coupling to the optical backplane, and a second one of the two ends for coupling to the optical connector of the at least one of the line cards.

13 Claims, 3 Drawing Sheets

OPTICAL BACKPLANE RACK ASSEMBLY WITH EXTERNAL OPTICAL CONNECTORS

CROSS-REFERENCE TO RELATED APPLICATIONS

This is the first application filed with regards to the present description.

TECHNICAL FIELD

The present disclosure relates to electronic devices and optical data communications, and more specifically to blade servers and line card chassis.

BACKGROUND

An increasing amount of effort has been deployed to increase the switching and processing capabilities of systems used in telecommunications and computing frames. The optical solution has been shown to be an efficient way forward.

Challenges arise in adapting electrical-based systems for optical compatibility. In electrical switching systems and servers, for example, the backplane of a chassis enclosing electronic circuit cards (also referred to herein as line cards, blades, nodes or switch cards) permits the routing of electrical signals from one card to another. A 'switch card' is typically used to direct the signals between line cards. Electrical interconnects between blades can however be very power consuming, require signal compensation techniques, and tend to suffer from large amounts of electro-magnetic interference and emission, which further limits the system's performance. The optical line card was thus introduced to address such limitations.

With the optical line cards, the 'optical' backplane replaced the all-electrical backplanes of older line card chassis. As the term indicates, "back-plane", the backplane is a backend of the chassis. Each line card is inserted inside the chassis, towards the backplane. Typically, optical line cards have an optical connector at their respective back ends to connect with the optical layer of the 'optical' backplane. Once conversion from optical high-speed multi-wavelength signals to electrical signals is achieved in the cards, the electrical signals can be routed back into the electrical portion of the 'optical' backplane, and in turn, enable the switching of microchips of other line cards for example. The term 'optical' backplane thus refers to a hybrid backplane with both electrical and optical connections within its layers.

A number of shortcomings such as optical coupling issues arise with prior art backplane chassis. Since the cards and the backplane are perpendicular to one another, typical interconnects involve the use of right-angle turn connectors, which are non ideal especially with regards to optical coupling efficiency. Prior art interconnecting are also limited in that complex alignment strategies are often required. In addition, periodical cleaning of the optical interfaces between the connectors is quite a challenge since interconnects reside deep inside the chassis, near the back end.

There is thus a need for an improved backplane chassis which addresses at least some of the issues associated with the prior art.

SUMMARY

As seen in the above section, prior art issues are herein addressed in order to improve coupling between the backplane of a chassis (also referred to as an enclosure or housing) and the cards inserted therein. The proposed enclosure and interconnecting method also intends to ease mounting of the cards into the enclosure for their connection with the backplane, and/or permit an easier cleaning of the interconnects.

In accordance with an embodiment, there is herein provided a line card rack assembly adapted for receiving line cards, at least one of the line cards having an optical connector at a front portion thereof. The rack assembly comprises a frame having a front opening, for receiving the line cards and providing access to the front portion of the line cards, and a back opening opposite the front opening; an optical backplane, at least partially covering the back opening, the optical backplane comprising connections for connecting the line cards upon insertion in the frame; and an optical fiber cable having two ends, a first one of the two ends being for coupling to the optical backplane, and a second one of the two ends for coupling to the optical connector at a front portion of the at least one of the line cards.

In accordance with an embodiment, there is herein provided an optical backplane for installation to a frame adapted for receiving line cards, at least one of the line cards having an optical connector accessible to a user for operative coupling with an optical fiber cable, the optical fiber cable having two ends, a first one of the two ends being for coupling to the optical backplane, and a second one of the two ends being for coupling to the optical connector of the at least one of the line cards. The optical backplane comprises: a front face comprising connections for connecting the line cards upon insertion in the frame, an area on the front face occupied by the connections defining a connection area; and a backplane optical coupling for providing the coupling to the first one of the two ends of the optical fiber cable, the backplane optical coupling being located outside the connection area.

In accordance with an embodiment, there is herein provided an optical fiber guide for guiding an optical fiber cable between a front opening of a frame for receiving line cards, and a back opening of the frame opposite the front opening. The optical fiber guide comprises a retaining structure which encases a sufficient portion of the optical fiber cable to releasably retain at least a portion of the optical fiber cable between the front opening and the back opening.

In the present description, the term "optical backplane" is intended to refer to an interconnection plane medium. In one embodiment, the optical backplane has both an electrical and optical layer for signal transmission therethrough via electrical grid-like interconnections and optical waveguides respectively. Whether electrical or optical, these connections provide a communication link between each one of the cards connected to the backplane. In one embodiment, the optical backplane is composed of copper traces in a printed circuit board FR-4 material, with at least one "optical layer" that guides light signals within the printed circuit board.

In the present description, the term "line card" is intended to refer to any printed circuit board with an electronic circuit thereon, with or without an optical portion. The term "optical line card" is herein intended to specify that the line card has an optical portion and/or an optical connector designed to be coupled with the optical backplane, independently of any other external optical connections which may be used as part of an optical transponder (i.e. such as in OC-48 or OC-192 type line cards).

BRIEF DESCRIPTION OF THE DRAWINGS

Further features and advantages of the invention will become apparent from the following present detailed description, taken in combination with the appended drawings, in which.

DETAILED DESCRIPTION

Figure 1:
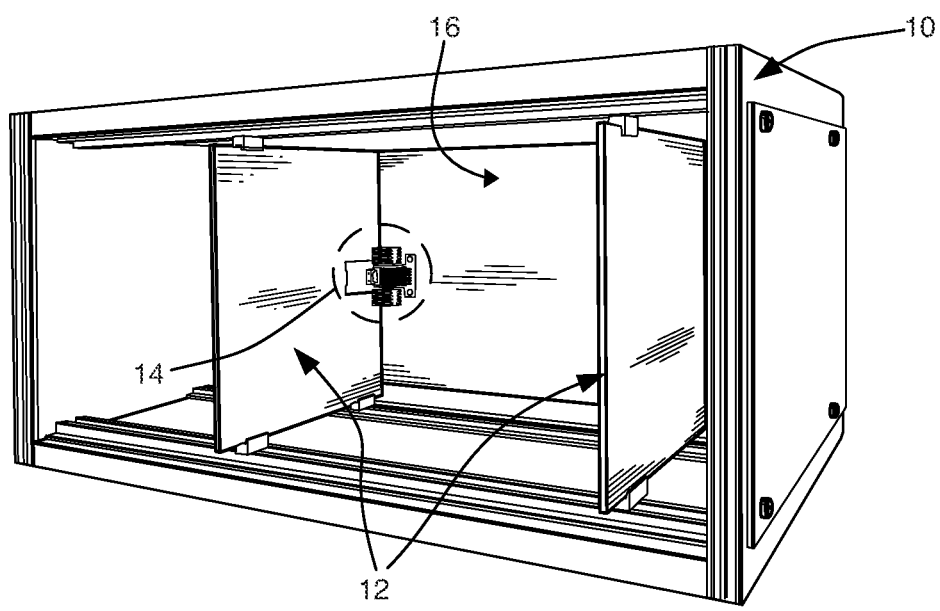
FIG. 1 is a perspective view of an line card chassis with line cards inserted therein, in accordance with the prior art.

FIG. 1 shows a chassis 10 for inserting optical line cards 12 in accordance with the prior art. As seen in this figure, an optical right angle turn connector 14 interconnects a mid-portion of the optical backplane 16 to the card 12. Since the optical line card 12 is inserted towards and in the optical backplane 16, perpendicularly to a plane of the optical waveguides, the optical "right-angle turn" is required in the connector 14. Typical prior art methods for coupling light between the optical line card 12 and the backplane 16 have been to place light-sources (such as micro-lasers and photo-detectors) at the back of the optical line card 12 (i.e. the side of the card nearest the backplane) and use complicated mechanisms to auto-align the light sources into holes performed at the interior side of the optical backplane 16. Since such optical right angle turn connectors 14 are typically sensitive to misalignments and prone to coupling losses, reliability of the alignment mechanisms becomes crucial to the entire operability and efficiency of the chassis 10. In addition, the process of cleaning the optical interfaces, at the connector 14 deep inside the chassis 10, is even more complex since the cards need to be at least partially removed therefrom, and then reinserted.

Figure 2:
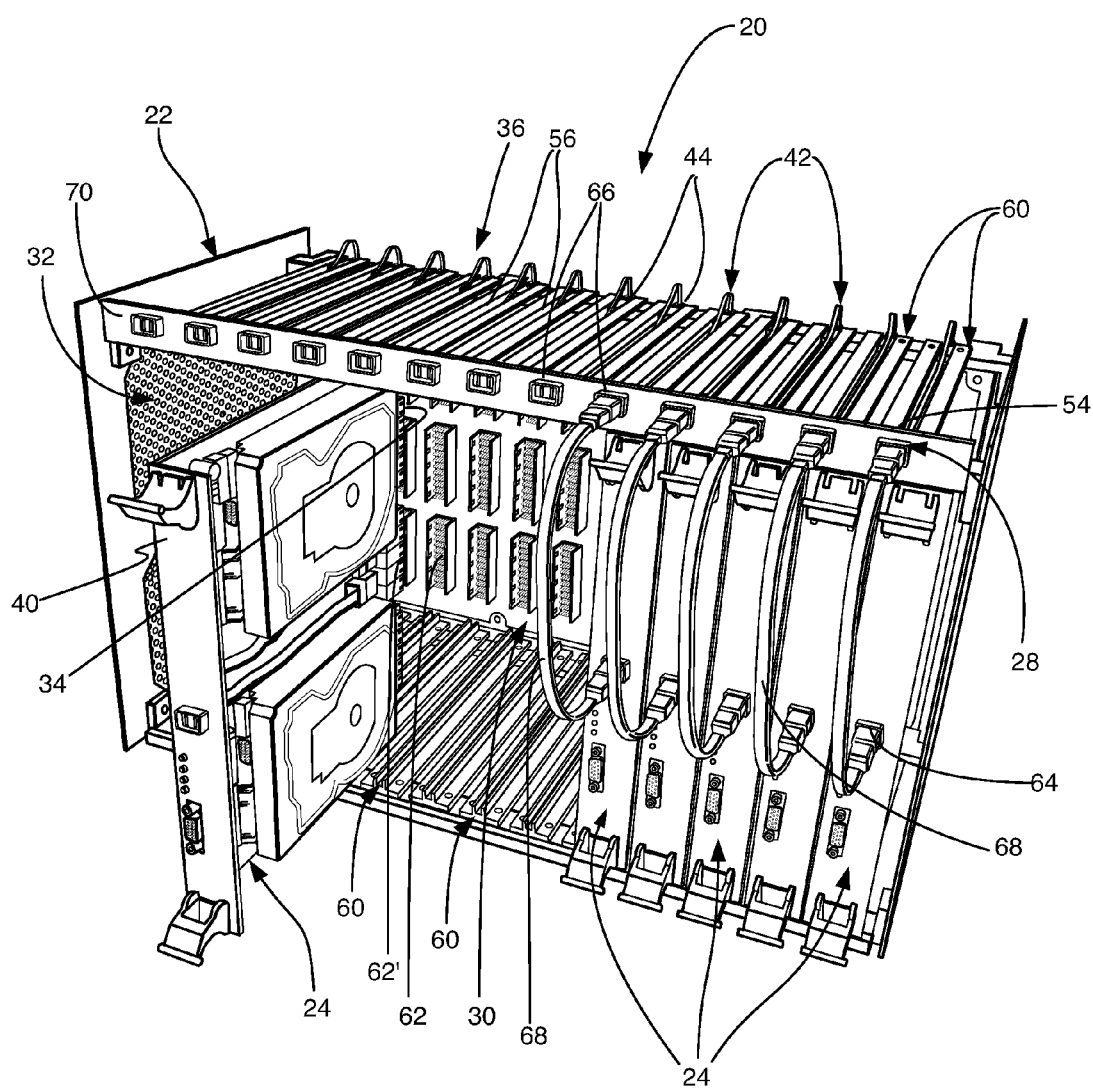
FIG. 2 is a perspective view of an line card rack assembly in accordance with an embodiment.

Now referring to FIG. 2, there is shown an improved line card rack assembly (generally indicated by reference numeral 20) in use with a frame 22 adapted to enclose line cards 24 therein. The line cards 24 can be standard line cards, or optical line cards with an optical connector or an optical circuit portion, at a front portion thereof, as shown.

The line card rack assembly 20 provides a coupling point 28 to the optical backplane 30 which is accessible to the front portion 40 of at the line cards 24; in one embodiment, externally to frame 22.

The frame 22 can be any type of frame, chassis, enclosure or other box-shaped structure for accommodating line cards 24 therein. The frame 22 has a front opening 32 for receiving the line cards 24 therein, with a back portion 34 of respective line cards 24 leading into the front opening 32, towards an opposite back opening 36. The back opening 36 is at least partially covered by an optical backplane 30. In one embodiment, sides of the optical backplane 30 are affixed to the frame 22 at the back opening 36. Adhesive, rivets, clips, screws, rails or any other affixing device may be used to fix the backplane 30 to the frame 22.

In one embodiment, the line cards 24 are inserted into the frame 22 such that the front portions 40 of respective line cards 24 remain accessible to a user via the front opening 32. The front portions 40 may be in alignment with the front opening 32 once completely inserted into the frame 22; remain protruding from the front opening 32 (not shown); or remain completely inside the frame 22 once the cards 24 are inserted. The back portions 34 of respective line cards 24 are meant to reach the back opening 36, and couple to a connection area of a front face 52 of the optical backplane 30. The connection area is defined as a surface where the connectors 62 are located on the front face 52 of the backplane 30.

Figure 3:
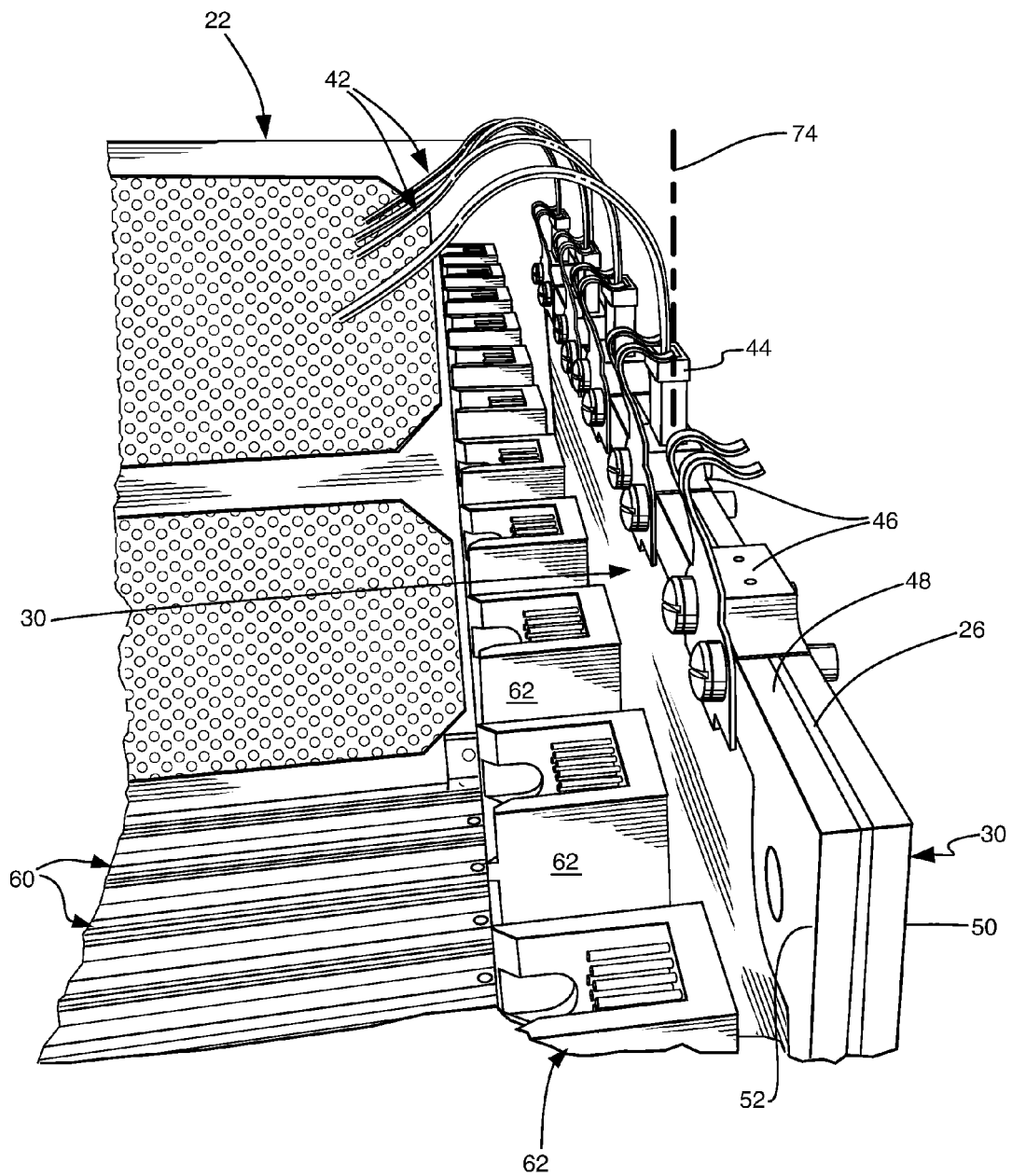
FIG. 3 is a close-up, partially dissembled view of the assembly of FIG. 2, nearest the optical backplane and with the top alignment rails removed, in accordance with an embodiment.

The optical backplane 30 permits the routing of optical, and optionally electrical, signals therethrough. As best seen in FIG. 3, an optical waveguide layer 26 is comprised within the optical backplane 30, along a plane thereof.

Still in reference to FIG. 2, the assembly 20 has optical fiber cable 42 having two ends 44 and 54. One end couples to the optical backplane 30, at a backplane optical coupling 46 located outside of the connection area defined by the connectors 62, on the front face 52 of the backplane 30. In one embodiment, the backplane optical coupling 46 is accessible externally to the frame 22.

It is noted that in one embodiment, the connectors 62 are electrical connectors provided on the front face 52 of the backplane 30, facing the front opening 32 of the frame 22. The connectors 62 are connectable, upon insertion of a line card 24 into the frame 22, to a corresponding connector 62' at the back portion 34 of the cards 24.

In one embodiment, and as best seen in FIG. 3, the backplane optical coupling 46 is an optical backplane connector. Alternatively, the optical fiber cable 42 can take the form of an optical fiber, an assembly of optical fibers, an optical fiber ribbon comprising multiple parallel optical fibers therein (i.e. by groupings of 12, 24, 36, etc. or more fibers), or a rigid wall with an optical waveguide layer providing optical connectivity grid therein.

The first end 44 of the optical fiber cable 42 is coupled to the optical backplane 30, via the optical backplane connector 46 which is located at a peripheral edge 48 of the backplane 30. Alternatively, though not shown, the optical fiber cable 42 connects to the backplane 30 at the rear face 50 thereof (i.e. the backplane optical coupling 46 is at the rear face 50).

The backplane optical coupling 46 is positioned anywhere on the optical backplane 30, except within the connection area of the front face 52, which is typically internal to the frame 22 when the backplane 30 is installed on frame 22.

Referring back to FIG. 2, the second end 54 of optical fiber cable 42 provides the coupling point 28 for coupling the front portion 40 of at the line cards 24 to the optical backplane 30. The second end 54 is connectable with any one of the line cards 24 having an optical connector 64 at their respective front portion 40. As in the embodiment illustrated in FIG. 2, the coupling point 28 may reside at a front edge of the front opening 32.

Still in reference to FIG. 2, the assembly 20 optionally has guiding means 56 for guiding the optical fiber cable 42 between the front opening 32 and the back opening 36 of the frame 22. More particularly in accordance with the illustrated embodiment where the optical carrying means 42 is an optical fiber cable, the guiding means 56 is an optical fiber guide.

The guiding means 56 has a retaining structure for encasing a portion of the optical carrying means 42 sufficient to retain the carrying means along a portion of the distance defined from the front opening 32 to the back opening 36 of the frame 22. The retaining structure allows for the releasing of the carrying means 42 by a user. For example, in the case where the optical carrying means 42 is an optical fiber cable, the optical fiber guide has a retaining structure which encases a sufficient portion of a circumference of the optical fiber cable to releasably retain at least a portion of the optical fiber cable between the front opening and the back opening. In such a case, the retaining structure can have a clip and/or a channel which extends on at least a portion of the distance between the front opening 32 and the back opening 36. The retaining structure can also be installed on a line card alignment rail 60 as further detailed below.

In one embodiment, alignment rails 60 joining the back opening 36 and the front opening 32 are provided along a periphery of the frame 22, either at a bottom or at a top thereof. Each alignment rail 60 aligns a line card 24 perpendicularly to the front and back openings 32 and 36. The alignment rails 60 can be as illustrated in FIG. 2, that is, formed by pairs of upper and lower guiding rails respectively placed on a top and/or a bottom of the frame 22, between the front and back openings 32 and 36. In this way, multiple cards 24 are each aligned perpendicularly to the front and back openings 32 and 36, with the lower rails optionally providing a support for the cards 24. In the illustrated embodiment, each alignment rail 60 is shown to include a slot for guiding an edge of the line card 24 from the front 32 to the back 36 openings. Also note that in the illustrated embodiment of FIG. 2, the guiding means 56 are provided on the alignment rails 60, whereby the rails provide a support to the guiding means 56. Although not shown, the guiding means 56 and the alignment rails 60 may be provided as separate unit elements, independent from one another.

As described above, line cards 24 each have an optical connector 64 at their respective front portions 40. In accordance with one embodiment, the second end 54 of the optical fiber cable 42 has an optical coupling device 66 which forms part of the coupling point 28. An optical coupling device 66 and an optical connector 64 of a given, aligned line card 24 are operatively coupled to one another via any coupling means, such as a removably connectable piece of optical fiber cable 68. The piece of optical cable 68 is connectable at one end with the optical coupling device 66, and at another end with the optical connector 64 of a given line card 24. As an example, the piece of optical cable 68 is a jumper cable with appropriate, corresponding connection ends adapted to be easily removable for maintenance and cleaning purposes.

As some of the line cards 24 need not be equipped with an optical connector 64, and only have an electrical such as connector 62' at their back portion 34, the assembly 20 is compatible with older types of available line cards which typically do not have an optical circuit portion and/or optical connection at their front. The connection are of the optical backplane 30 is also adaptable for use with various types of electrical connections in order to suit both legacy line cards and newer optical line cards for example.

In one embodiment, the coupling points 28 are provided along a front edge 70 of the front opening 32, optionally closest to a line card 24 to which it ought to be connected. The optical fiber cable 42 however need not be aligned with a respective card (i.e. a network of optionally inter-crossing signal carrying means 42 is usable to connect any one of the cards 24 to any one of the backplane optical couplings 46).

It is noted that the optical coupling devices 66 may be standard optical connectors compatible with most optical connectors of line cards available on the market.

Contrary to prior art, the above-described assembly 20 provides for optical coupling points 28 at a front of the frame 22, from where the line cards 24 are accessible for insertion and removal. The coupling points 28 provide accessible connectivity with the optical backplane 30 which is itself inaccessible to a user from the front opening 32 of the frame 22. Optical coupling devices 66, optical connectors 64 and jumper cables 68 are thus easily cleanable, as illustrated by FIG. 2. The assembly 20 remains completely passive in that there is no need for alignment laser sources and detachable connectors, or other complicated alignment mechanisms as generally required in the prior art to connect the optical portions of line cards with the optical backplane. The optical carrying means 42 is flexible and permits redirection of optical signals from the optical backplane 30 towards a front opening 32 of the frame 22, for easy access and coupling thereto.

FIG. 3 shows a close-up view of the backplane 30 of the assembly 20 of FIG. 2. The backplane optical coupling 46 is provided as an optical backplane connector located at a peripheral edge 48 of the optical backplane 30. As seen in the Figure, the signal coupling plane 74 at the connection between the optical backplane connector 46 and the first end 44 of the optical carrying means 42 (herein illustrated as an optical fiber cable), is parallel to the optical waveguide layer 26 of the optical backplane 30 (i.e. there are no right-angle turns with respect to the plane of the optical backplane 30). In one embodiment, the connecting end 44 of the optical carrying means 42 is an MT ferrule adapted for connection with the optical backplane connector 46. The ferrule and the optical coupling connector of the backplane optical coupling 46 can be secured together with a clipping device such as the one described in U.S. Patent Application US 2007/0258683.

While preferred embodiments have been described above and illustrated in the accompanying drawings, it will be evident to those skilled in the art that modifications may be made therein without departing from the essence of this disclosure. Such modifications are considered as possible variants comprised in the scope of the disclosure.

The invention claimed is:

1. A line card rack assembly adapted to receive line cards, at least one of the line cards having an optical connector at a front portion thereof, the rack assembly comprising:
   a frame having a front opening, for receiving the line cards and providing access to the line cards, and a back opening opposite the front opening, the frame having a front edge on the front opening;
   an optical backplane, at least partially covering the back opening, the optical backplane comprising connections for connecting the line cards upon insertion in the frame, the optical backplane further comprising an optical layer; and
   an optical fiber cable having two ends, a first one of the two ends being for coupling to the optical layer of the optical backplane, and a second one of the two ends comprising an optical coupling device installed on the front edge of the frame, the optical coupling device for coupling to the optical connector at a front portion of the at least one of the line cards.

2. The line card rack assembly of claim 1, wherein the optical backplane comprises:
   a front face comprising the connections, an area on the front face occupied by the connections defining a connection area; and
   a backplane optical coupling for providing the coupling to the first one of the two ends of the optical fiber cable, the backplane optical coupling being located outside the connection area.

3. The line card rack assembly of claim 2, wherein the backplane optical coupling comprises an optical backplane connector for releasably connecting the optical fiber cable from the optical backplane.

4. The line card rack assembly of claim 3, wherein the optical backplane further comprises a rear face opposite the front face and a peripheral edge, the optical backplane connector being located on one of: the rear face and the peripheral edge.

5. The line card rack assembly of claim 3, wherein the optical backplane is located within a plane and further comprising a peripheral edge, the optical backplane connector extending from the peripheral edge and substantially within the plane.

6. The line card rack assembly of claim 1, wherein the connections to the line cards comprise electrical connectors being connectable, upon insertion of at least one of the line cards into the frame, to corresponding electrical connectors of the line cards.

7. The line card rack assembly of claim 1, further comprising an optical fiber guide to releasably retain at least a portion of the optical fiber cable between the front opening and the back opening.

8. The line card rack assembly of claim 7, wherein the optical fiber guide comprises a retaining structure which encases a sufficient portion of the optical fiber to releasably retain at least a portion of the optical fiber cable between the front opening and the back opening.

9. The line card rack assembly of claim 8, wherein the retaining structure comprises at least one of: a clip; and a channel extending on at least a portion of a distance between the front opening and the back opening of the frame.

10. The line card rack assembly of claim 9, further comprising a line card alignment rail supporting the retaining structure.

11. The line card rack assembly of claim 10, wherein the line card alignment rail further comprises a slot for guiding an edge of one of the line cards upon insertion inside the frame.

12. The line card rack assembly of claim 11, further comprising another optical fiber cable for being removably connected between the optical coupling device and the optical connector of the at least one of the line cards.

13. The line card rack assembly of claim 1, wherein the optical fiber cable comprises at least one of: an optical fiber, an assembly of optical fibers, an optical fiber ribbon, and an optical waveguide device.

* * * * *